(No Model.)  7 Sheets—Sheet 1.

D. D. RANNEY.
MACHINE FOR CANNING.

No. 373,306.  Patented Nov. 15, 1887.

Witnesses
Inventor
Darwin D. Ranney
By Offield and Towle Atty's (No Model.) 7 Sheets—Sheet 3.

D. D. RANNEY.
MACHINE FOR CANNING.

No. 373,306. Patented Nov. 15, 1887.

Witnesses,

Inventor,
Darwin D. Ranney
By Offield and Towle,
Att'ys.

(No Model.)

D. D. RANNEY.

MACHINE FOR CANNING.

No. 373,306.

7 Sheets—Sheet 4.

Patented Nov. 15, 1887.

Witnesses,

Inventor,
Darwin D. Ranney
By Offield and Towle,
Att'ys.

(No Model.) 7 Sheets—Sheet 5.

D. D. RANNEY.
MACHINE FOR CANNING.

No. 373,306. Patented Nov. 15, 1887.

Witnesses,
L. F. Mann,
Frederick F. Goodwin

Inventor,
Darwin D. Ranney
By Offield & Towle,
Attys.

(No Model.) 7 Sheets—Sheet 6.

D. D. RANNEY.
MACHINE FOR CANNING.

No. 373,306. Patented Nov. 15, 1887.

Witnesses,

Inventor,
Darwin D. Ranney
By Offield and Towle, Atty's

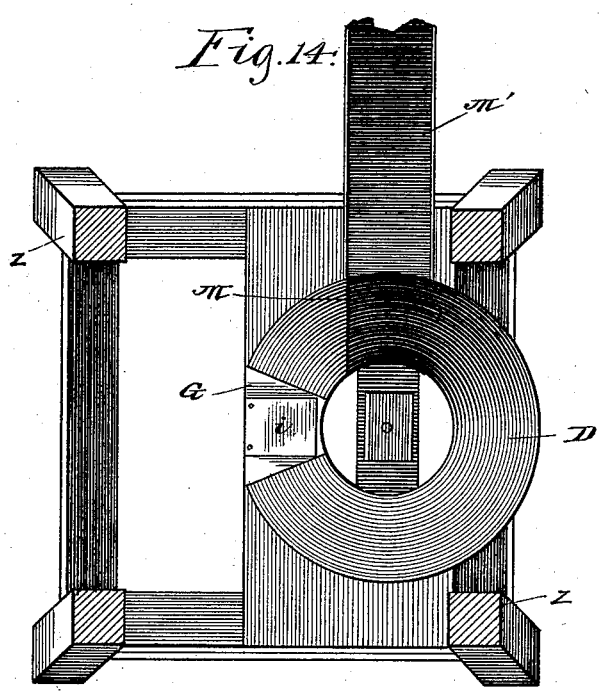

UNITED STATES PATENT OFFICE.

DARWIN D. RANNEY, OF LEWISTOWN, ILLINOIS.

MACHINE FOR CANNING.

SPECIFICATION forming part of Letters Patent No. 373,306, dated November 15, 1887.

Application filed July 23, 1887. Serial No. 245,078. (No model.)

*To all whom it may concern:*

Be it known that I, DARWIN D. RANNEY, a citizen of the United States, residing at Lewistown, in the county of Fulton and State of Illinois, have invented a certain new and useful Improvement in Machines for Canning, which I desire to protect by Letters Patent of the United States, of which the following is a specification.

My invention is more especially designed for canning tomatoes, in which certain objections incident to canning by ordinary processes are obviated, and also by which the operation is greatly facilitated. In order to effect a rapid operation in canning fruit or whole tomatoes by machinery, a considerable force is required in the introduction of the article into the can. By reason thereof the operation is attended in the usual methods with considerable damage to the article undergoing the canning process, especially tomatoes, which are easily crushed. This defect in the operation I have provided against by using steam or compressed air as the direct agent in filling the can. The employment of steam or air, instead of a hard substance, owing to the elasticity of the former, entirely prevents damage to the entirety of the tomato.

My invention also relates to mechanism generally applicable to canning apparatus.

Figure 1:
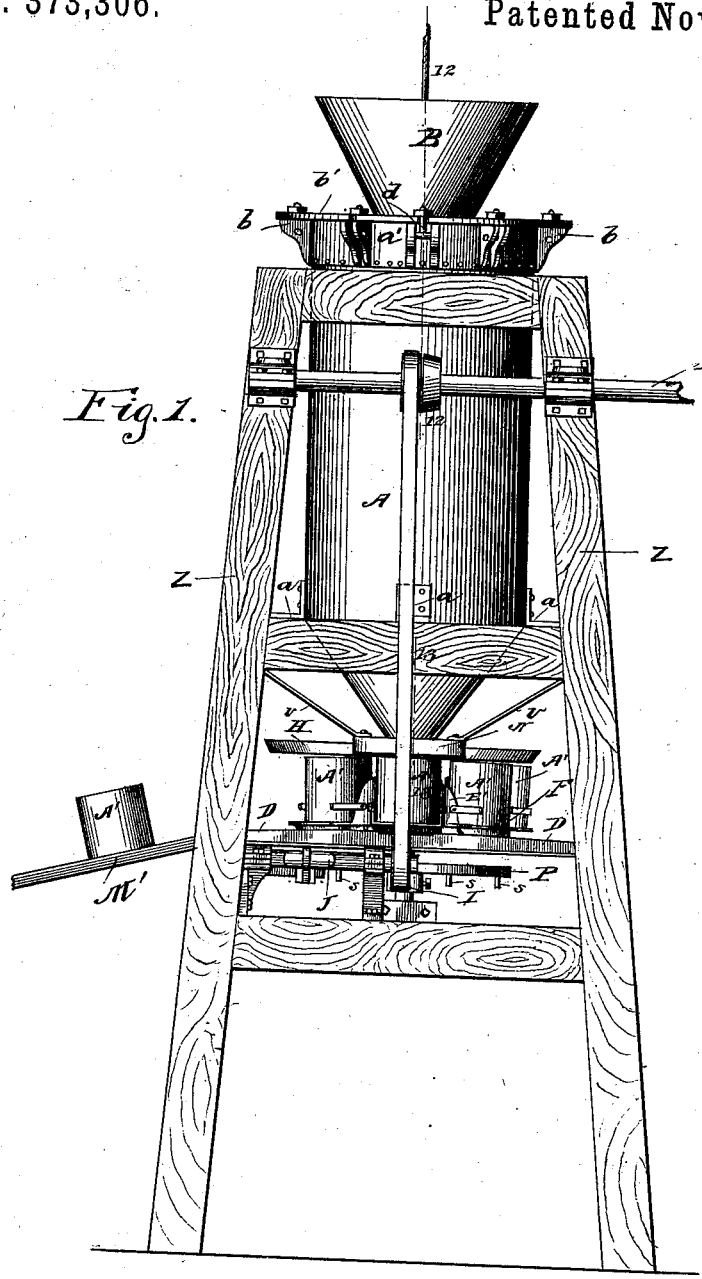
Figure 2:
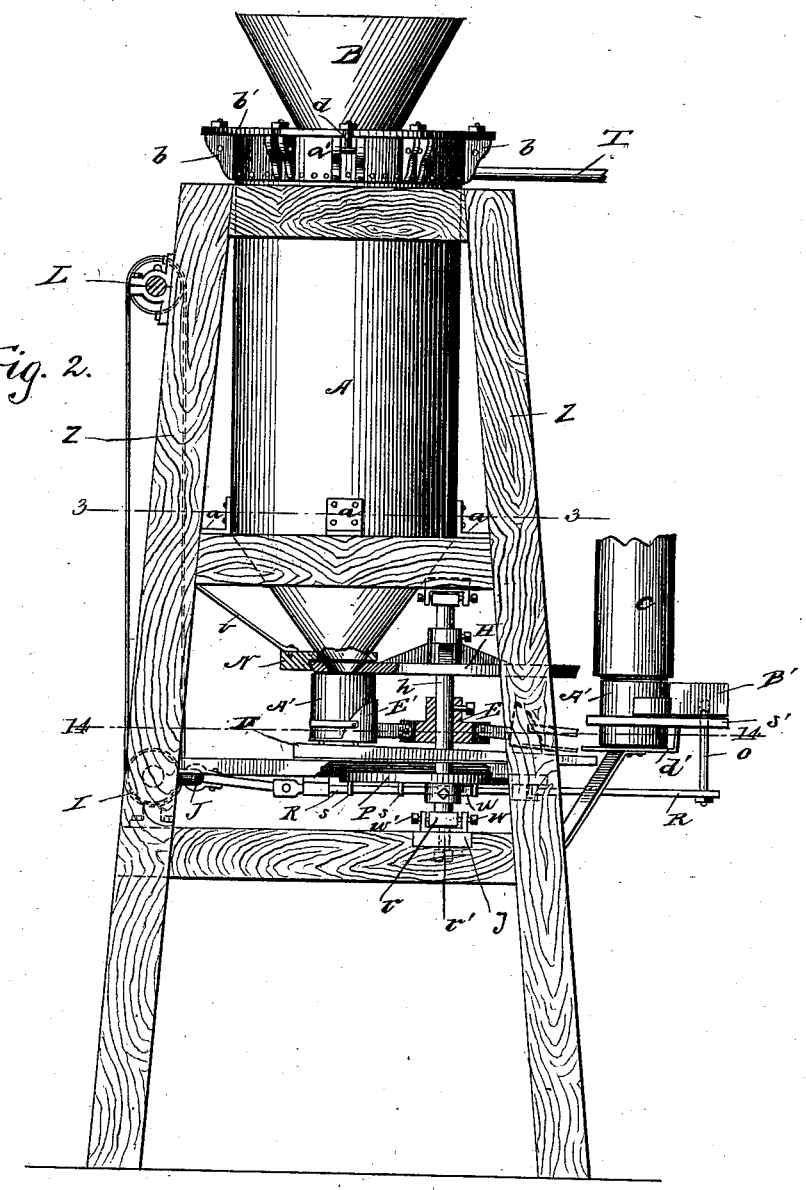
Figure 3:
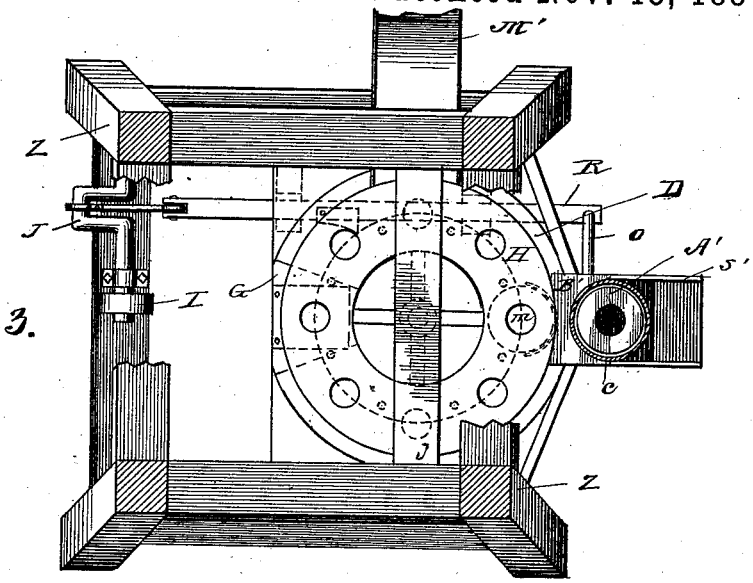
Figure 4:
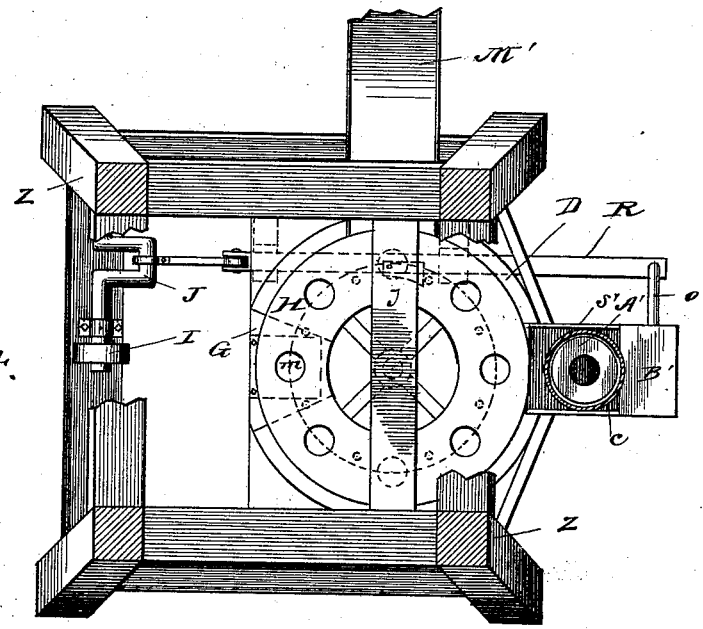
Figure 5:
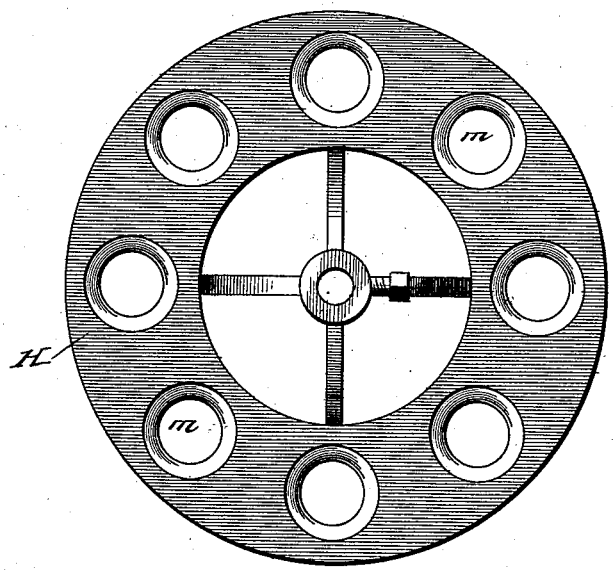
Figure 6:
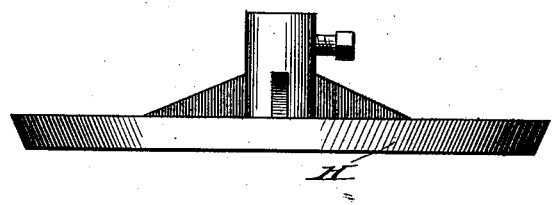
Figure 7:
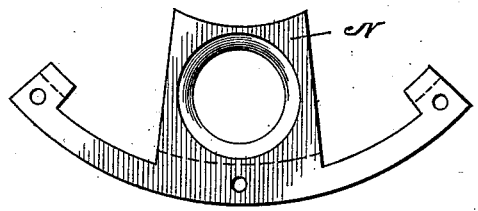
Figure 8:
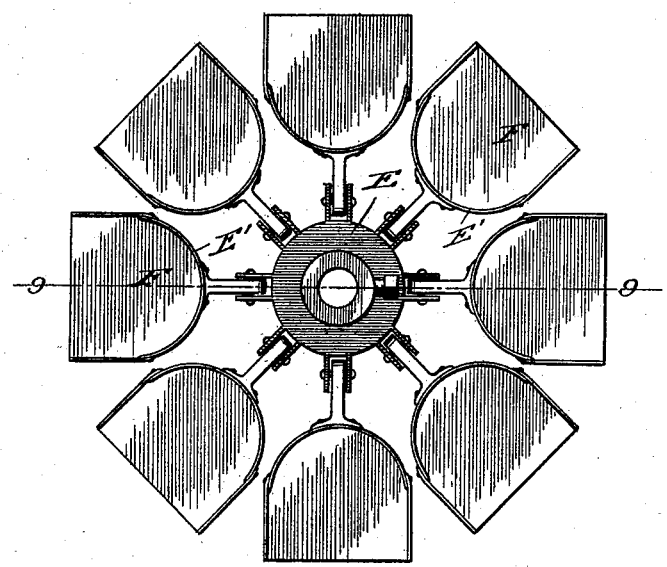
Figure 9:
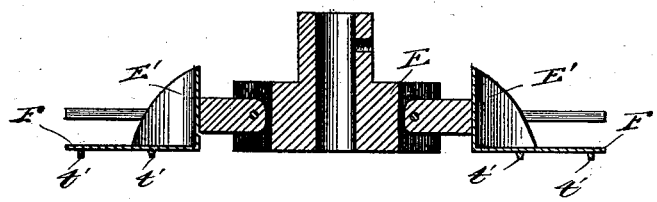
Figure 10:
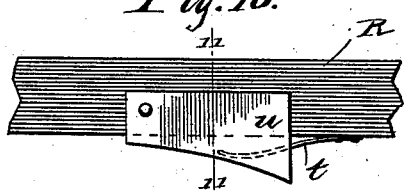
Figure 11:
Figure 12:
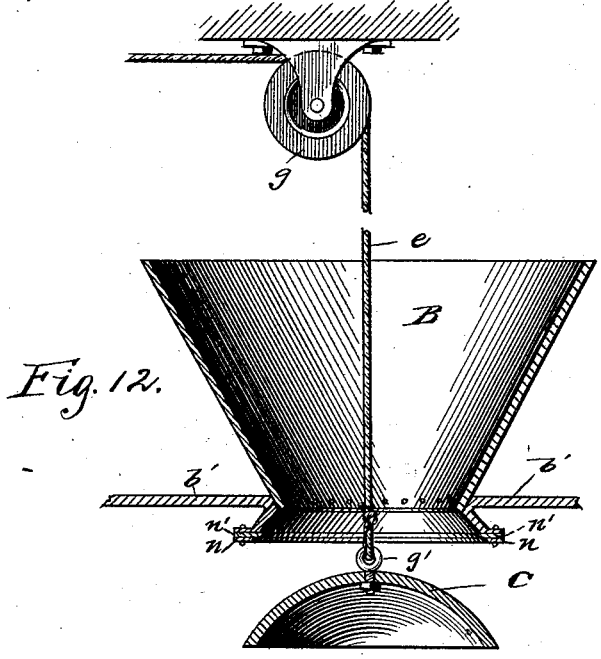
Figure 13:
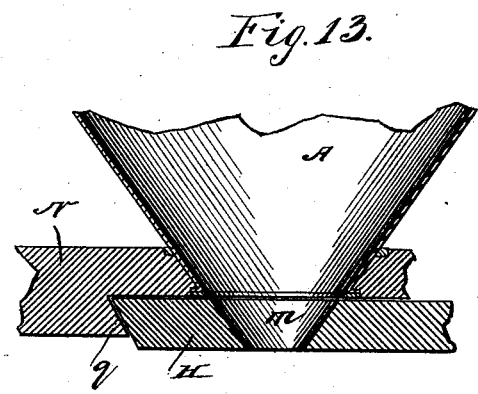

In the annexed drawings, making a part of this specification, Figure 1 is an elevation of the apparatus. Fig. 2 is also an elevation, showing a side at right angles to that shown in Fig. 1. Figs. 3 and 4 are sectional plans on line 3 3, Fig. 2, showing some of the mechanism in different positions. Fig. 5 is a plan view of a revolving plate. Fig. 6 is an elevation of the part shown in Fig. 5. Fig. 7 is a detail in plan. Fig. 8 is also a detail in plan. Fig. 9 is a vertical section through Fig. 8 on line 9 9. Fig. 10 is a detail relating to pawl action. Fig. 11 is a sectional detail view on line 11 11, Fig. 10. Fig. 12 is an enlarged sectional detail view on line 12 12, Fig. 1. Fig. 13 is also an enlarged sectional view on line 13 13, Fig. 1. Fig. 14 is a sectional plan on line 14 14, Fig. 2.

In Figs. 1 and 2 is shown the frame or structure Z, upon which the canning mechanism is supported, consisting in the present example of four uprights suitably connected together by beams or ties for proper stability and for proper support of mechanism. The feed-receptacle A, preferably constructed of sheet metal, is secured in the structure, as indicated at $a\ a$. The upper end of receptacle A is incased in a cast-iron collar, $a'$, to which it is riveted. Collar $a'$ is provided with a series of double brackets, $b$, cast integral therewith and disposed at regular intervals around its outer surface. A hopper, B, (see Fig. 12, where it is shown in vertical section,) is encircled at its throat or contracted portion by a flanged plate, $b'$, to which it is secured by rivets or otherwise in a manner to form a tight joint between the two. Flange $b'$, in conjunction with the hopper, forms the cover of receptacle A. As a means of securing the flange $b'$ in position, and so as to permit of ready removal, its periphery is notched at intervals corresponding to the brackets $b$. Within the latter are T-bolts $d$, that have their lateral extensions pivotally supported in the brackets. The stems of said bolts are respectively threaded and provided with nuts. Thus, as apparent, the stems are brought into position in the notches of flange $b'$, where by tightening said nuts the flange is secured. The reverse operation permits ready removal of the receptacle-cover.

The flaring extension of hopper B beneath the cover $b'$ is flanged at its lower edge, beneath and against which is fitted an annular plate, $n$, secured by bolts, between which and the flange of the hopper is inserted a rubber or flexible gasket, $n'$, the inner portion of which projects inwardly from the plate, and is designed as a packing or seat inclosing the bottom of the hopper. A spherical or hemispherical valve, C, (shown in section in Fig. 12,) is designed for the last-named purpose. By means of a staple, $g'$, inserted centrally in said valve, or other like provision, the latter is suspended by a cord or cable, $e$, extending down through the interior of the hopper. The cable is supported above on a pulley, $g$, from whence it is extended to any convenient point for manipulation. To close the hopper, valve C is drawn up tightly, when the cable is secured. The rotundity of the valve is so adapted to the flaring lower portion of the hopper that, with the gasket intervening, a tight joint is effected.

Receptacle A has a tapering or funnel-shaped lower portion, (shown in section in Fig. 13,) with a discharge-opening at the extremity, beneath which the cans are successively brought automatically in the operation of filling. A platform, upon which is formed a circular track, D, is secured within the supporting-structure. (Shown in plan in Fig. 14.) Concentrically with the opening, centrally of track D, is a vertical shaft, $h$. The latter has its lower bearing on a cross-beam, $j$. By means of a set-screw or otherwise is secured on shaft $h$, just above track D, a hub, E. The latter is provided with radially-projecting ears in which are hinged the shanks of a series of can-carriers, F. From shaft $h$, and at a distance above the carriers suited to the height of the can, is secured a plate, H. (Shown in detail in Figs. 5 and 6.) Plate H is provided with apertures $m$, corresponding in number and position with carriers F. A means for rotating shaft $h$ and the part secured thereto is provided by connection of mechanism with a crank-shaft, J. The latter has suitable journal-bearings in the supporting structure, and is provided at one end with a pulley, I. A drive-shaft, L, near the upper portion of the structure, provided with a loose and fast pulley between which and pulley I connection is formed by means of a belt, serves for the transmission of power to the operating mechanism of the apparatus. As a part of the mechanism for driving shaft $h$, the latter has secured to it near its lower end a plate, P, on the under surface of which, projecting downwardly, is a series of pins, $s$. On suitable sliding bearings is provided a bar, R, connected at one end by a pitman to a crank-shaft, J. On bar R is pivotally attached a pawl, $u$, designed to engage with pins $s$. Pawl $u$ is held in a normal position with relation to bar R by a spring, $t$.

The relation of the parts to the can-carriers with reference to intervals of pins and stroke of bar R is such as to revolve shaft $h$, and consequently said carriers, a given and uniform distance at each stroke. Pawl $u$ on the return-stroke of bar R yields under the pressure of spring $t$, and thus passes the pins $s$. A plate, N, with a central orifice fitting closely around the discharge end of receptacle A, is permanently fixed in that position shown in detail in Fig. 7, in which the dotted line shows the position of the periphery of plate H. Rods $v$ indicate the manner of fastening said plate in the present example. A detail of this feature is shown in Fig. 13, the purpose being to prevent escape or leakage of the contents of the receptacle during the operation of automatically removing cans from under or replacing them beneath the said receptacle in the operation of filling.

Plate N is provided with a bevel-shoulder on its under surface, $q$, and the periphery of plate H is also beveled correspondingly. In this connection an adjustment of shaft $h$, upon which plate H is supported, is provided for. In Fig. 2 the manner of supporting shaft $h$ is shown, wherein the step $r$, upon which it pivotally rests, is supported within vertical ears or fixed jaws that are secured to the cross-beam. For the purpose of vertical adjustment of the shaft, step $r$ is supported upon a vertically-operating set-screw, $r'$. Step $r$ is less in breadth than the space within the ears, and is supported laterally by set-screws $w$ and $w'$ at each side, which permits of an adjustment of the shaft towards or from the receptacle. The top bearing of shaft $h$ is also provided for adjustments in a similar manner. That the position of shaft $h$ with relation to the discharge-mouth of the receptacle is such as to bring the circular path of the can-carrier and the openings in the plate H corresponding thereto beneath said mouth is obvious. The carriers F, from the fact of their hinged connection, require support in the performance of their function, which is afforded by track D.

Mechanism for automatically supplying the cans to the carriers is shown in Fig. 2, in which a permanent stand, $d'$, is supported by a brace. Located above this stand is fixed a tube, $c$, having an interior diameter suited to permit the passage of cans through it. Tube $c$, the lower end only of which is shown, may be supported in any manner at its upper end and so constructed with a funnel top or otherwise as to facilitate supplying it with cans as required. The interval between the bottom of tube $c$ and the stand $d'$ is equal to the height of a can. The bar R, in addition to its other function, also serves in supplying the cans to the carriers. The said bar extends beyond the stand $d'$, and is provided with a vertical extension, $o$. Upon a horizontal projection from the latter is a recessed plate, $s'$, rigidly secured thereto. The location of said plate is about midway of the can A' and its recess is adapted to partially embrace said can.

Upon plate $s'$ is secured a cut-off, B', adapted, when required, to pass just beneath the bottom of tube $c$. When not so employed, its position is just without the circumference of the latter. Carriers F at their inner portions are provided with vertical extensions E', curved with relation to a vertical axis, and adapted to receive and fix the positions of the cans while the latter are undergoing the filling operation. To obviate unnecessary friction the under surfaces of the carriers are provided with runners $t'$, that slide on track D. That portion of track D on which the carriers stand during the operation of filling the cans, as shown at G, Fig. 14, is somewhat elevated above the other portions of the track, and is provided with a spring-plate, $i$, normally held slightly above the surface of the track at its inner portion.

From the surface of G track D gradually descends to the point M, where a considerable depression occurs. From thence, throughout its remaining extent, the track gradually ascends to the horizontal portion G. Opposite the point M is a discharge-chute, M'. The positions of pins s and the length of stroke of bar R are such that in the operation of the mechanism each successive movement brings one carrier F with its can A' beneath the discharge-opening of receptacle A and upon the horizontal portion G of the track and one carrier opposite the tube c. The retracting movement of bar R carries inwardly with it the plate s', thereby drawing a can onto the adjacent carrier. At the same time with the latter operation the cut-off B' is brought beneath tube c, thus preventing a premature descent of the next can from the tube. The succeeding and opposite movement of the bar R causes the return of parts B' and s', and allows another can to descend to the stand d', and at the same time, by the action of pawl u against one of the pins s, advances the carrier and the can resting thereon from its position beneath the receptacle and brings the next in order into such position. When a carrier has reached the depression M, owing to its hinged or flexible connection with the hub E, it tips downward, and thereby causes the filled can to slide off and down said chute, and thus, for the filling part of the operation of canning, disposes of said can.

The higher point, G, of the track is designed to bring the top of the can tightly against plate H, and any slack that may occur in this particular is compensated for by the action of spring i. Preparatory to the operation of filling the cans the whole tomatoes are supplied to the receptacle through the hopper B with the valve C down, after which, by means of cable e, said valve is secured in position to tightly close the hopper-bottom.

In Fig. 2 is shown a pipe, T, leading to the interior of the receptacle at its top. By this means steam or compressed air is introduced to the upper surface of the contents of the receptacle to exert pressure thereon and force the said contents into the can beneath. The amount of pressure should of course be regulated to meet the requirements.

In view of the foregoing description little, if any, recapitulation is necessary explanatory of the mechanism in which the empty cans are fed to the tube c and lodged successively upon the stand d', from whence, by a retracting movement of the bar R, a can is drawn upon a carrier F, during which time further descent of the cans in tube c is prevented by cut-off B'. The reverse stroke of bar R brings the pawl u in contact with a pin s, and thereby partially rotates shaft h, and necessarily with it the carriers and upper plate, H, in which a can at each forward stroke of the bar is thus brought beneath the receptacle and the one preceding it displaced and allowed to slide down the chute M'. The tapered openings m in plate h are of course concentric with the cans when the latter are in proper position on the carriers. The said openings m at the under surface of the plate are suited to the size of the filling-aperture of the can, so that the surface on top of the can exterior to the openings forms a close joint for the time with the under surface of said plate H. Close contact of plate H with the plate N may be maintained against wear or other displacements by means of the facilities for adjusting shaft h vertically and laterally, as before stated, whereby in the latter movement the bevel of plate H is made to move in close contact with the bevel q of plate N.

Having thus described my invention, what I claim, and desire to protect by Letters Patent, is—

1. The method of canning whole tomatoes, which consists in introducing the tomatoes into a receptacle, then hermetically closing said receptacle, and finally introducing compressed air or steam to force the tomatoes through the discharge-orifice in said receptacle, which is adapted to be alternately opened and closed.

2. In a canning-machine, a vertical shaft, a hub supported thereon, a series of can-carriers hinged to said hub, a circular track upon which said carriers travel, in combination with a receptacle for the preparatory introduction of the articles being canned that is located above the orbit of said carriers and provided with a discharge-mouth, and a plate provided with a series of openings corresponding in positions to the carriers that are adapted to pass closely beneath the discharge-opening of the receptacle, whereby the intervening portions of the plate successively open and close said mouth.

3. In a canning-machine, a series of revolving carriers, a reciprocating bar adapted to intermittently move said carriers at one of its strokes, and an extension from said reciprocating bar adapted to engage with and draw cans upon the carriers at the return stroke of said bar, substantially as set forth.

4. In a canning apparatus, the receptacle A, having a collar, a', upon which are formed brackets b, carrying T-bolts d, in combination with hopper B, the latter being provided with a notched flange, b', and valve C, substantially as set forth.

5. In a canning apparatus, the combination of a track, D, of varying height, with hinged or flexibly-connected can-carriers F, said track being circular and the said carriers adapted to travel thereon, substantially as set forth.

6. In a canning apparatus, the combination of receptacle A, plate N, revolving plate H, shaft h, the latter being adapted to vertical and lateral adjustments, and the carriers F, mounted upon said shaft h, substantially as described.

7. In a canning apparatus, shaft h, the carriers F, mounted upon said shaft h, and disk or plate P, also mounted upon said shaft and provided with pins s, in combination with bar R, provided with pawl $u$, and the shaft J, substantially as specified.

8. In a canning apparatus, the revolving carriers F, in combination with stand $d'$, reciprocating bar R, and recessed plate $s'$, substantially as set forth.

9. In a canning apparatus, the revolving can-carriers F, stand $d'$, reciprocating bar R, recessed plate $s'$, and tube $c$, substantially as specified.

10. In a canning apparatus, revolving can-carriers F, stand $d'$, reciprocating bar R, recessed plate $s'$, tube $c$, and cut-off B', substantially as described.

DARWIN D. RANNEY.

Witnesses:
MOSES TURNER,
HENRY PHELPS.